(12) United States Patent
Talwalkar et al.

(10) Patent No.: US 11,387,859 B2
(45) Date of Patent: Jul. 12, 2022

(54) METHOD AND APPARATUS FOR MITIGATING IMAGE INTERFERENCE IN A RECEIVER

(71) Applicant: MOTOROLA SOLUTIONS, INC., Chicago, IL (US)

(72) Inventors: Sumit A Talwalkar, Weston, FL (US); Geetha B. Nagaraj, San Diego, CA (US); Nicholas G. Cafaro, Parkland, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 228 days.

(21) Appl. No.: 16/915,041

(22) Filed: Jun. 29, 2020

(65) Prior Publication Data

US 2021/0409056 A1 Dec. 30, 2021

(51) Int. Cl.
| H04B 1/26 | (2006.01) |
| H04B 17/318 | (2015.01) |
| G06N 20/00 | (2019.01) |
| G06N 3/04 | (2006.01) |
| H04L 1/20 | (2006.01) |
| H04L 25/03 | (2006.01) |

(52) U.S. Cl.
CPC .......... H04B 1/26 (2013.01); G06N 3/0454 (2013.01); G06N 20/00 (2019.01); H04B 17/318 (2015.01); H04L 1/203 (2013.01); H04L 25/03834 (2013.01)

(58) Field of Classification Search
CPC .......... H04B 1/26; H04B 17/318; H04B 1/18; H04B 1/0475; H04B 1/109; H04B 2001/0491; H04B 7/15585; H04B 15/04; H04B 1/1036; G06N 3/0454; G06N 20/00; G06N 3/0445; G06N 3/084; G06N 3/08; H04L 1/203; H04L 25/03834; H04L 2027/0016; H04L 27/14; H04L 2027/0024; H04L 27/364; H04L 27/0012; H04L 27/361; H04L 27/2647; G06T 2207/10016; H03C 3/005
See application file for complete search history.

(56) References Cited

U.S. PATENT DOCUMENTS

| 7,683,842 B1 * | 3/2010 | Engel | H04B 17/20 342/170 |
| 10,396,919 B1 * | 8/2019 | O'Shea | G06N 3/08 |

(Continued)

FOREIGN PATENT DOCUMENTS

WO WO-02084870 A2 * 10/2002 ................ H03J 3/08

OTHER PUBLICATIONS

The International Search Report and the Written Opinion corresponding patent application No. PCT/US2021/034708 filed: May 28, 2021, dated Aug. 12, 2021, all pages.

(Continued)

*Primary Examiner* — Lana N Le
(74) *Attorney, Agent, or Firm* — Barbara R. Doutre

(57) ABSTRACT

An improved superheterodyne receiver for a portable radio is provided. The receiver includes a frequency controller that applies pulse-shaped modulation to first and second LO signals in a synchronized manner. The frequency controller is steered by Artificial Intelligence (AI) based machine learning (ML) to determine first and second LOs that minimize image interference in the baseband signal.

18 Claims, 12 Drawing Sheets

(56) References Cited

U.S. PATENT DOCUMENTS

| | | | |
|---|---|---|---|
| 10,992,331 B2* | 4/2021 | Jassal | H04B 1/3816 |
| 2003/0193923 A1* | 10/2003 | Abdelgany | H04B 1/406 |
| | | | 370/320 |
| 2005/0174928 A1* | 8/2005 | Yoneya | H04L 27/2647 |
| | | | 370/208 |
| 2006/0194552 A1* | 8/2006 | Jin | H04B 17/29 |
| | | | 455/226.1 |
| 2013/0279216 A1* | 10/2013 | Nguyen | H02M 7/4833 |
| | | | 363/39 |
| 2014/0302809 A1* | 10/2014 | Haub | H04B 1/123 |
| | | | 455/307 |
| 2016/0072592 A1* | 3/2016 | Tu | H04B 1/406 |
| | | | 375/219 |
| 2016/0126988 A1* | 5/2016 | Mester | H04B 1/10 |
| | | | 375/350 |
| 2018/0102793 A1 | 4/2018 | Talty et al. | |
| 2019/0274108 A1* | 9/2019 | O'Shea | G06N 3/0472 |

OTHER PUBLICATIONS

Richard S. Sutton and Andrew G. Barton: "Reinforcement Learning: An Introduction", 'Chapter 3: Finite Markov Decision Processes', Second edition, in progress, A Bradford Book, The MIT Press, Cambridge, Massachusetts, London, England, 2014, 2015.
Multilayer Perceptron-DeepLearning 0.1 documentation, http://www.deeplearning.net/tutorial/mlp.html#mlp, downloaded from internet: May 28, 2020, pp. 1-12.
Alex Graves: "Supervised Sequence Labelling with Recurrent Neural Networks", http://www.cs.toronto.edu/~graves/preprint.pdf, downloaded from the internet: May 28, 2020, all pages.

* cited by examiner

METHOD AND APPARATUS FOR MITIGATING IMAGE INTERFERENCE IN A RECEIVER

FIELD OF THE INVENTION

This application pertains to communication devices and more particularly to image interference mitigation in a superheterodyne (superhet) receiver.

BACKGROUND OF THE INVENTION

Radio communication devices operate using a receiver and/or transmitter. The radio receiver receives radio frequency (RF) signals and converts information carried by such signals to a usable form, referred to as a baseband signal. The information contained within the baseband signal may be in the form of audio, images and/or digital data. The superhet receiver architecture is particularly useful as receivers operate at increasingly higher frequency bands. FIG. 1 is block diagram of a prior art superhet radio receiver. The superhet receiver converts an RF signal to the baseband signal in two steps, first to an intermediate frequency (IF) and then to the baseband. The superhet receiver has well-known advantages such as ease of filtering out-of-band noise more effectively at the IF than at the RF. However, the superhet architecture has the well-known disadvantage of potential for interference from a different radio frequency called the image frequency which may cause performance degradation negatively impacting communications.

Accordingly, there is a need for an improved superhet radio receiver that can mitigate receiver image interference.

BRIEF DESCRIPTION OF THE SEVERAL VIEWS OF THE DRAWINGS

The accompanying figures, where like referenced numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
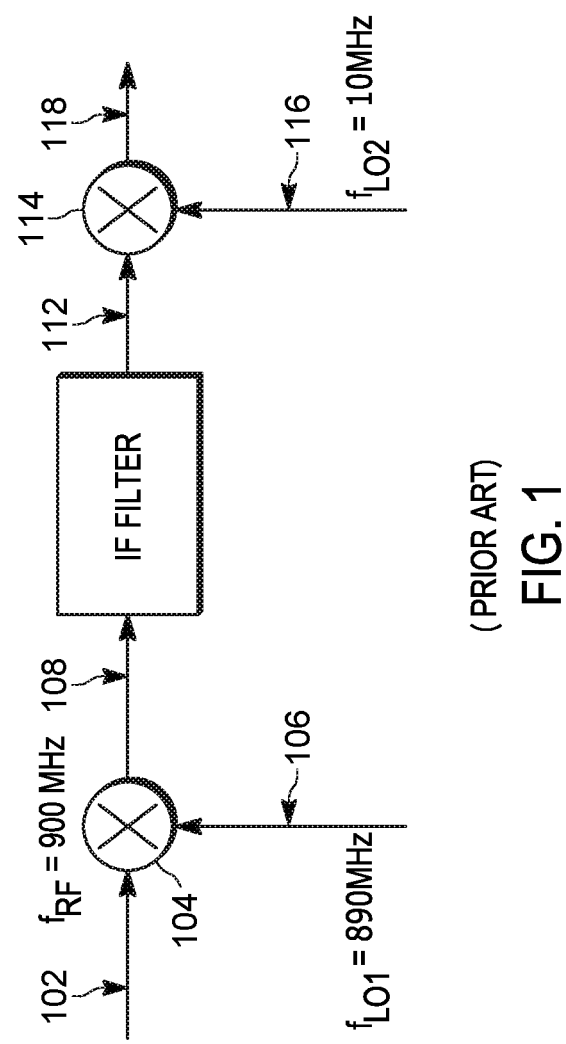
FIG. 1 is block diagram of a prior art superhet radio receiver.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A super-heterodyne receiver is a type of receiver that uses frequency mixing to convert a received RF signal to an intermediate frequency (IF) which can be filtered and then converted to baseband more easily than direct conversion of the RF signal. The super-heterodyne receiver mixes a first local oscillator (LO) signal with the incoming RF signal to generate sum and difference frequencies, one of which will be the intermediate frequency (IF) signal of interest. However, the super-heterodyne radio receiver is also responsive to unwanted incoming signals at another RF frequency, called an image frequency, that also mixes down to the same IF frequency. In super-heterodyne receivers, an image frequency is equal to the carrier frequency at the desired RF plus (or minus) twice the intermediate frequency depending on whether the first mixing stage uses a local oscillator frequency (LO1) above or below the desired RF, respectively. Hence, the LO1 frequency becomes the midpoint of the image frequency and the RF frequency. For example, if the RF frequency is 900 MHz and the LO frequency is at 890 MHz, then the image frequency is at 880 MHz. Any interference occurring at the image frequency mixes onto the IF signal at the output of the mixer. In this example, undesirable energy at the image frequency may result in two radio channels being received at the same time as the desired signal, thus producing interference. The mitigation or the avoidance of the image interference is addressed in the embodiments to follow via the application of artificial intelligence to the superhet receiver. Artificial intelligence is used to detect image interference and to dynamically control frequency modulation of the local oscillator back to the mixers.

Briefly, there is provided herein an improved super-heterodyne receiver that utilizes artificial intelligence (AI) to provide deliberate and synchronized modulation of first and second local oscillator frequencies for image interference mitigation while preserving the signal of interest. In accordance with the embodiments, AI based machine learning (ML) is applied to determine a local oscillator modulation sequence to minimize image interference. The AI facilitates interference detection and is used to control adaptive modulation of first and second local oscillator frequencies. The combination of first and second LO modulation exactly cancel each other for the desired signal, and the first and second LO modulations add to each other to spread the image signal. Additionally, pulse shaping is applied to the LO modulation. The pulse shaping advantageously limits spectral regrowth of the IF signal in order to enable reconstruction of the baseband signal.

For the purposes of this application, the signal of interest will be referred to as the IF signal, with the understanding that this further applies to Low IF as well as Very low IF (VLIF) signals. For the purposes of this application, the baseband signal is considered the desired signal, the baseband signal having been modulated at the incoming RF frequency and then recovered as an output from the second mixer with the understanding that this recovered baseband signal goes on to further baseband filtering before completing the demodulation process.

Figure 2:
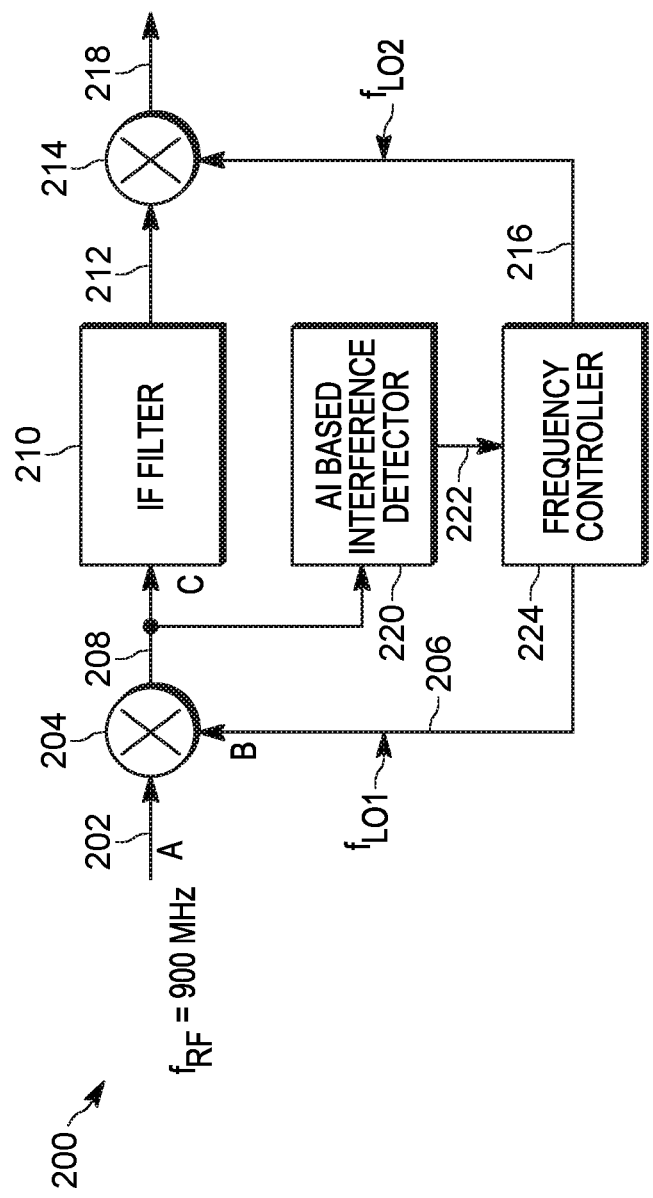
FIG. 2 is block diagram of a superhet radio receiver formed and operating in accordance with various embodiments.

FIG. 2 is block diagram of a superhet radio receiver formed and operating in accordance with various embodiments. A radio frequency (RF) signal is received, such as via an antenna and other front end radio circuitry (not shown), which is presented as RF signal 202 input to a first mixer 204, while a first local oscillator (LO) signal 206 is also input to the first mixer. The first mixer 204 mixes the RF signal 202 and first LO signal 206 to generate an intermediate frequency (IF) signal 208. Points A, B, C of the block diagram 200 respectively indicate the RF signal 202 input to the first mixer 204, the first LO signal 206 input to the first mixer 204, and output signal 208 from the first mixer 204. For example, an RF signal 202 of 900 MHz (A) may be mixed with the first LO signal 206 of 890 MHz (B) to generate an IF signal 208 of 10 MHz as well as an unwanted product at 1790 MHz (C). An IF filter 210 filters out the higher frequency components at 1790 MHz leaving a filtered IF signal 212 at 10 MHz. The filtered IF signal 212 is applied to a second mixer 214, while a second local oscillator (LO) signal 216 is input to the second mixer to generate a baseband signal 218. For example, a 10 MHz filtered IF signal may be mixed with a second LO signal of 10 MHz to generate a baseband signal. The baseband signal 218 is further filtered via a baseband filter (not shown) to generate a filtered baseband signal of 0 MHz (DC). The filtered baseband signal is applied to further processing circuitry and output to a user interface, such as a speaker, display, or a digital demodulator.

In accordance with the embodiments, an AI based interference detector 220 is incorporated into the receiver 200 to receive the IF signal 208, at the output of the first mixer 204, to detect for the presence or absence of an image interferer. The AI based interference detector 220 may be implemented using, for example, an energy detector receiving the IF signal 208 and taking an energy measurement, wherein the energy measurement is run through an interference detector algorithm to generate detected interference information. In accordance with the various embodiments, AI techniques are used to train the interference detector algorithm run by AI interference detector 220. The AI based interference detector 220 generates an information signal 222 pertaining to the presence or non-presence of image interference and applies this information signal to a frequency controller 224.

In accordance with the embodiments, frequency controller 224 generates and dynamically controls both the first LO 206 and the second LO 216 based on the AI detection. The AI is advantageously applied within receiver 200 for interference detection and adaptive modulation of the first and second local oscillator frequencies. The application of AI-driven LO modulation advantageously takes place within LO paths with strong signals, and thus does not require the use of additional components in the noise sensitive RF path that may handle weak signals.

In accordance with the embodiments, AI is advantageously used to control the first and second local oscillator signals 206, 216 of FIG. 2. The AI based control applies frequency modulation (static or dynamic) combined with pulse shaping to the first and second LOs 206, 216. The LO modulation advantageously limits the in-band power of the image interferer while the pulse shaping advantageously allows the bandwidth requirement of the IF filter 210 not to be unreasonably wide and still allow for reconstruction of the desired signal.

Figure 3:
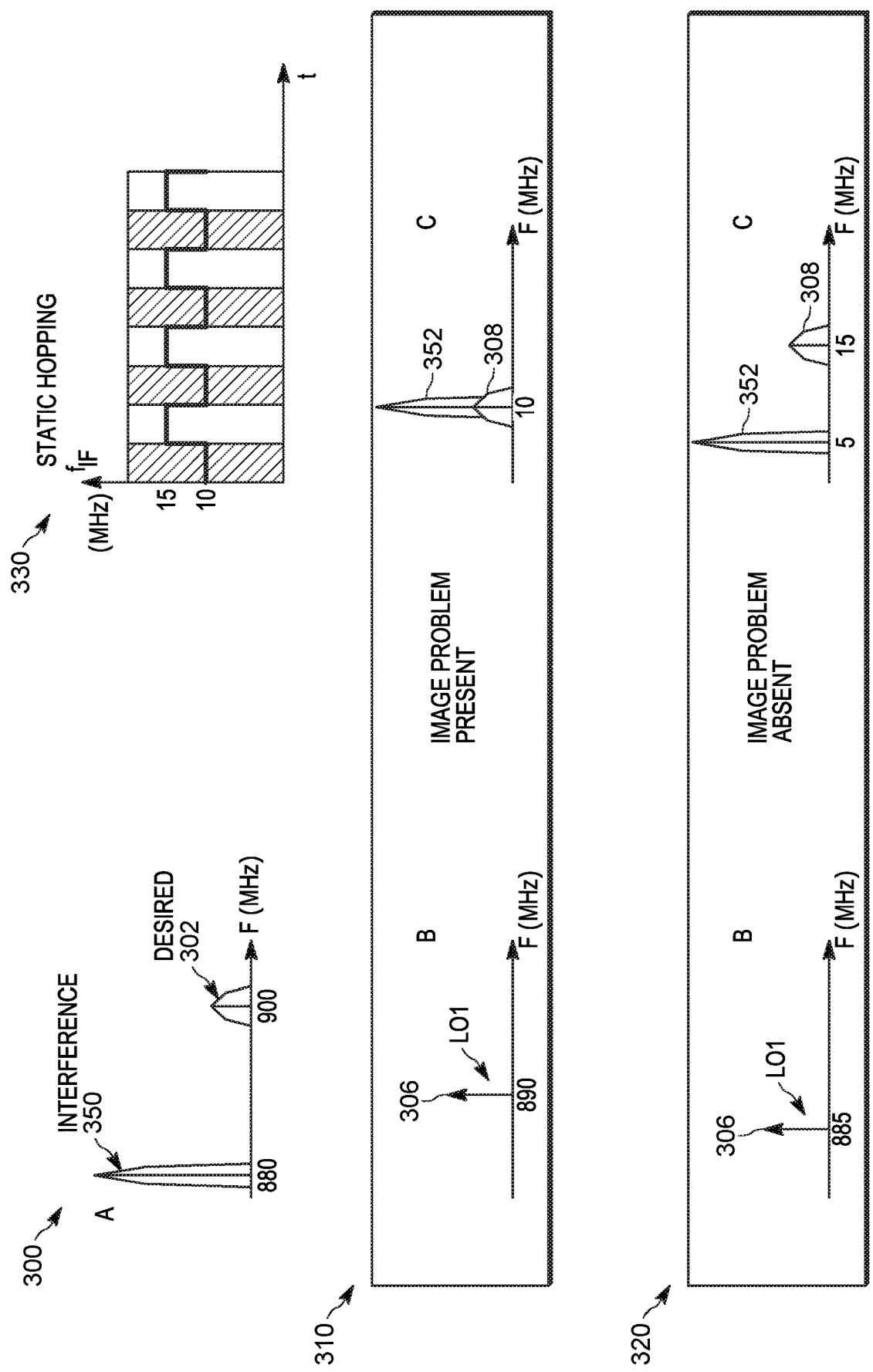
FIG. 3 shows graphs illustrating the impact of presence and absence of image interference on a desired signal to illustrate the effect of alternating the intermediate frequency in accordance with various embodiments.

For illustrating the effect of LO modulation consider an example of static hopping, wherein the first and second LO may alternate between first and second sets of frequency values. For example, an incoming RF signal of 900 MHz may be mixed with a first LO hopping between 885 MHz and 890 MHz to generate the IF output. FIG. 3 shows graphs 300, 310, 320 and 330 illustrating the impact to the IF signal as a result of applying static hopping to the first LO. The graphs refer back to points A, B, C of the block diagram 200 of FIG. 2 to facilitate review.

Graph 300 shows an incoming RF signal 302 of 900 MHz (A) with a potential image interferer 350 of 880 MHz. The incoming RF signal 302 of 900 MHz is mixed with a first LO 306 (B) hopping between 890 MHz (shown in graph 310) and 885 MHz (shown in graph 320) to generate IF signal 308 at the first mixer output (C). Graph 310 shows that when a first LO 306 of 890 MHz (B) mixes with the 900 MHz RF signal 302 with image interferer 350 of 880 MHz, then the IF signal 308 of 10 MHz is subjected to a co-incident image interferer 352 at the same frequency of 10 MHz generated at first mixer output (C). Graph 320 shows that when a first LO 306 of 885 MHz (B) is used to mix with the 900 MHz RF signal 302 with image interferer 350 of 880 MHz, then an image interferer 352 of 5 MHz is not co-incident on the IF signal of 15 MHz generated at first mixer output (C). The IF signal resulting from static hopping of the first LO between two LO values is shown in a graph 330. Graph 330 shows IF output (fIF) versus time (t) with the interference to the IF signal having been cut to half of the time. Further static hopping can be applied, synchronously by the frequency controller 224 of FIG. 2, hopping between 10 MHz and 15 MHz, to the second LO 216 to mix at second mixer 214 with the filtered IF signal 212 to mix down the desired signal to baseband.

In accordance with some embodiments, the second LO 216 is moved to compensate the first LO's movement so that the desired signal continues to be mixed down to baseband. The hopping between the two frequencies has been used for ease of illustration, with the understanding that the addition of pulse shaping to the above example of FIG. 3, will result in a frequency vs. time graph (330) which will smoothly vary between two values.

An important consequence of the alternating the LO frequencies can be understood by realizing that the first and second LO signals are no longer pure tones, but frequency modulated signals. Such modulated LO signals have spectral characteristics that are dependent on the instantaneous frequencies used (890 MHz and 885 MHz in the case of the first LO in the illustration in FIG. 3), but also the rate at which they are changed. Thus, a modulated LO increases the bandwidth of the IF filter. In accordance with the various embodiments, the pulse shaping is applied to switching frequencies. For example, the pulse-shaping may be applied using frequency shift keying (FSK) based modulation schemes. Similar pulse-shaping is used to advantageously to limit the bandwidth of the first LO and consequently, of the IF signal. The examples of modulating the first and the second LOs in FIGS. 3, 4 and 5 have been provided without the pulse shaping for ease of illustration and explanation, however, it is to be understood that any hopping or modulation of the first and the second LO is to be done along with pulse-shaping in order to limit the increase in the bandwidth requirement of the IF filter. If pulse shaping is not used, then, depending on the increased first LO bandwidth, it may be impossible to design an IF filter and impossible to recover the desired signal.

In another embodiment, image mitigation for the same RF signal 302 of 900 MHz (A) with a potential image interferer 350 of 880 MHz. Here the image interference mitigation is achieved by sweeping across a plurality of LO frequencies synchronously for the first and the second LO. The frequency sweeping can be done, as shown in FIG. 4, with predetermined static hopping steps or as shown in FIG. 5 using adaptive hopping.

Figure 4:
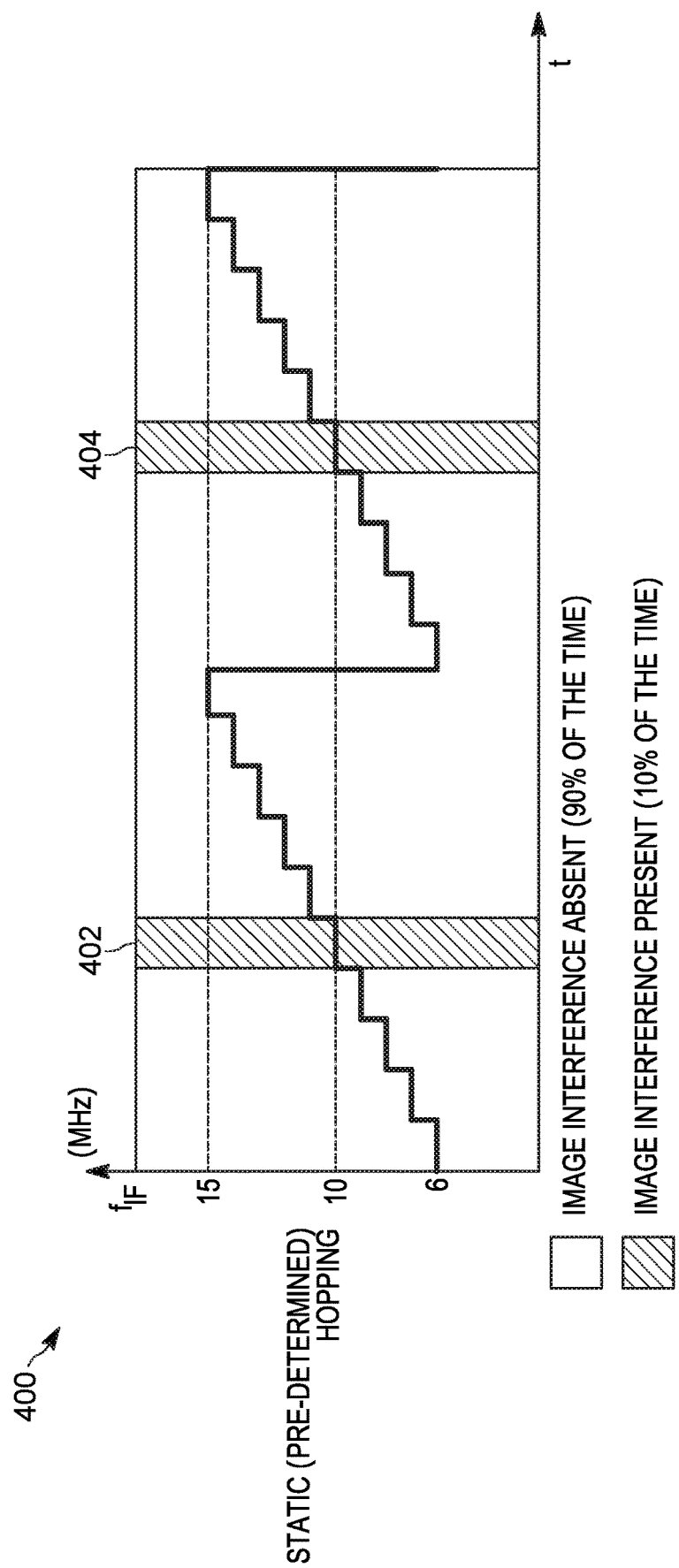
FIG. 4 shows a graph illustrating predetermined frequency hopping as applied to the intermediate frequency over a set of ten predetermined values in accordance with various embodiments.
Figure 5:
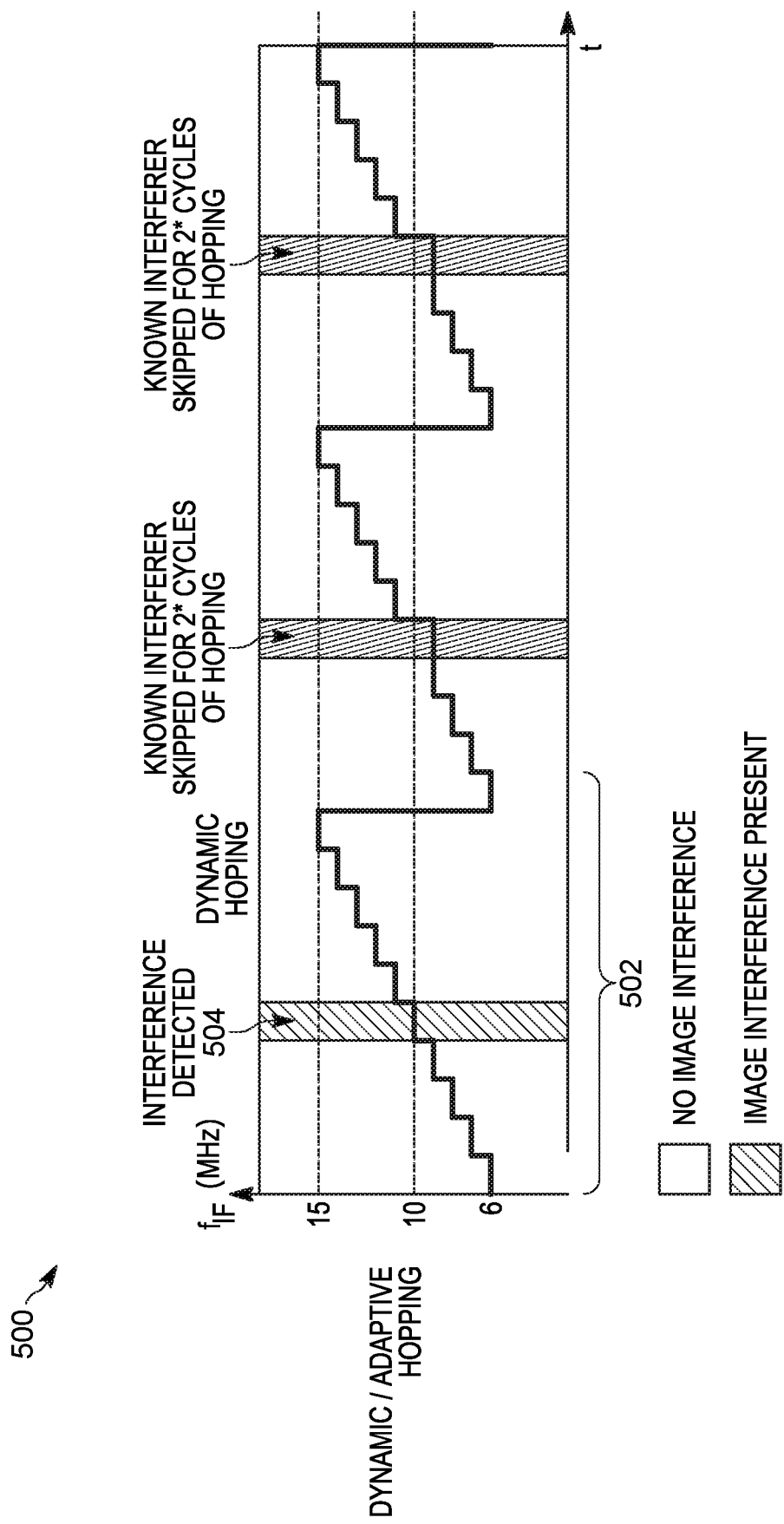
FIG. 5 shows a graph illustrating dynamic adaptive frequency hopping as applied to the intermediate frequency in accordance with various embodiments.

In FIG. 4, graph 400 shows an example of the application of static frequency sweeping using predetermined step decrements of the first LO from 894 MHz to 885 MHz over periodic cycles corresponding to an IF frequency sweep from 6 MHz to 15 MHz in 1 MHz steps, shown here over two cycles. The second LO needs to be swept synchronously with the IF frequency from 5 MHz to 15 MHz in order to correctly recover the desired signal at baseband. Here, the IF signal (fw) is interfered with for one of ten frequency hops, that is, for only ten percent of the time, (402, 404). For simplicity of illustration, graph 400 shows a saw-tooth like periodic traversal of the IF frequency. In an actual practical implementation, the hopping would be applied in a pseudo-random sequence of frequencies synchronously to the first and second LOs. Such a pseudo-random sequence of frequencies can be provided by, for example, using frequency shift keying (FSK) modulated with pseudo-random symbols to manage spectral re-growth and help in signal reconstruction at baseband. As pointed out previously, pulse-shaping of the first and second LO is advantageously used to manage the spectral growth of the LO signals.

The synchronized modulation of the first and second LOs acts to cancel each other as applied to the desired signal. The image interferer, on the other hand, experiences the LO modulations in the same direction, thereby adding to the extent to which the image signal is spread. In accordance with the embodiments, the spreading and de-spreading are both done within the receiver and are much easier to control in a synchronized fashion. The desired signal undergoes spreading in the first mixer and is reconstructed in the de-spreading due to equal and opposite modulation in the second mixer. The image interferer, on the other hand, experiences spreading twice, once at the first mixer and then equal spreading again at the second mixer providing for improved interference mitigation.

In a worst case scenario, if all the IF frequencies were to encounter image interference, then the performance of the receiver 200 would be no worse than a non-hopping receiver. The frequency controller 224 may also decide, based on the information provided by the AI interference detector 220, not to modulate the LOs.

Referring to FIG. 5, graph 500 illustrates the application of frequency sweeping across a plurality of LO frequencies using adaptive hopping in accordance with some embodiments. Similar to FIG. 4, the first LO goes from 894 MHz down in steps of 1 MHz to 885 MHz every cycle. During a first cycle of hopping 502 in which ten steps are taken by the instantaneous IF frequency between 6 MHz and 15 MHz, the AI interference detector 220 of FIG. 2, determines that there is an image interferer present at 10 MHz 504. After a suitably chosen number of cycles (shown here for simplicity as one cycle 502), the known image frequency is skipped by skipping of the first LO frequency associated with the interfered IF. As mentioned previously, the interference detector 220 of FIG. 2 can be implemented using an energy detector, or similar other signal processing block such as a Short-Time Fourier Transform (STFT), providing input to machine learning based algorithm that steers the frequency controller. In accordance with some embodiments, AI techniques such as deep neural network (DNN) or reinforcement learning (RL) are used by the image interference detector 220 that controls the pulse-shaped modulation of the first and second LO frequencies in a synchronized fashion.

Figure 6:
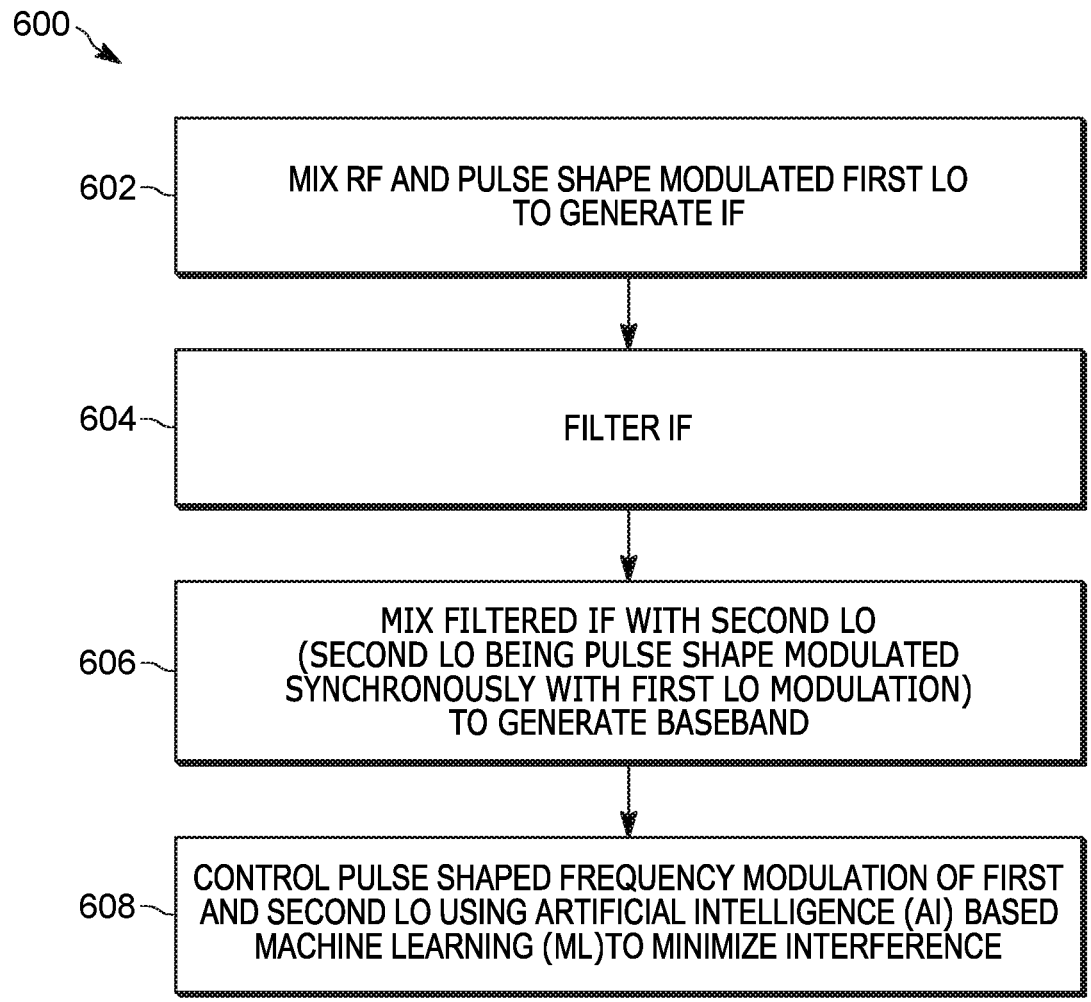
FIG. 6 shows a flowchart summarizing a method to manage interference in a receiver.

Referring to FIG. 6, there is shown a flowchart summarizing a method to manage image interference in a superhet receiver. Method 600 begins by mixing a radio frequency (RF) signal and a suitably pulse-shape modulated first local oscillator (LO) signal to generate an intermediate frequency (IF) signal at 602, followed by filtering the IF signal to generate a filtered IF signal at 604. At 606, mixing the filtered IF signal and a second local oscillator (LO) signal that is pulse-shape modulated in a synchronized fashion with the first LO modulation in equal amount but opposite direction to generate a baseband signal. At 608, in accordance with the various embodiments, frequency modulation of the first and second LO signals is controlled in a synchronized manner using a frequency controller, the frequency controller using Artificial Intelligence (AI) based machine learning (ML) to determine an LO modulation sequence that minimizes image interference in the baseband signal.

Figure 7:
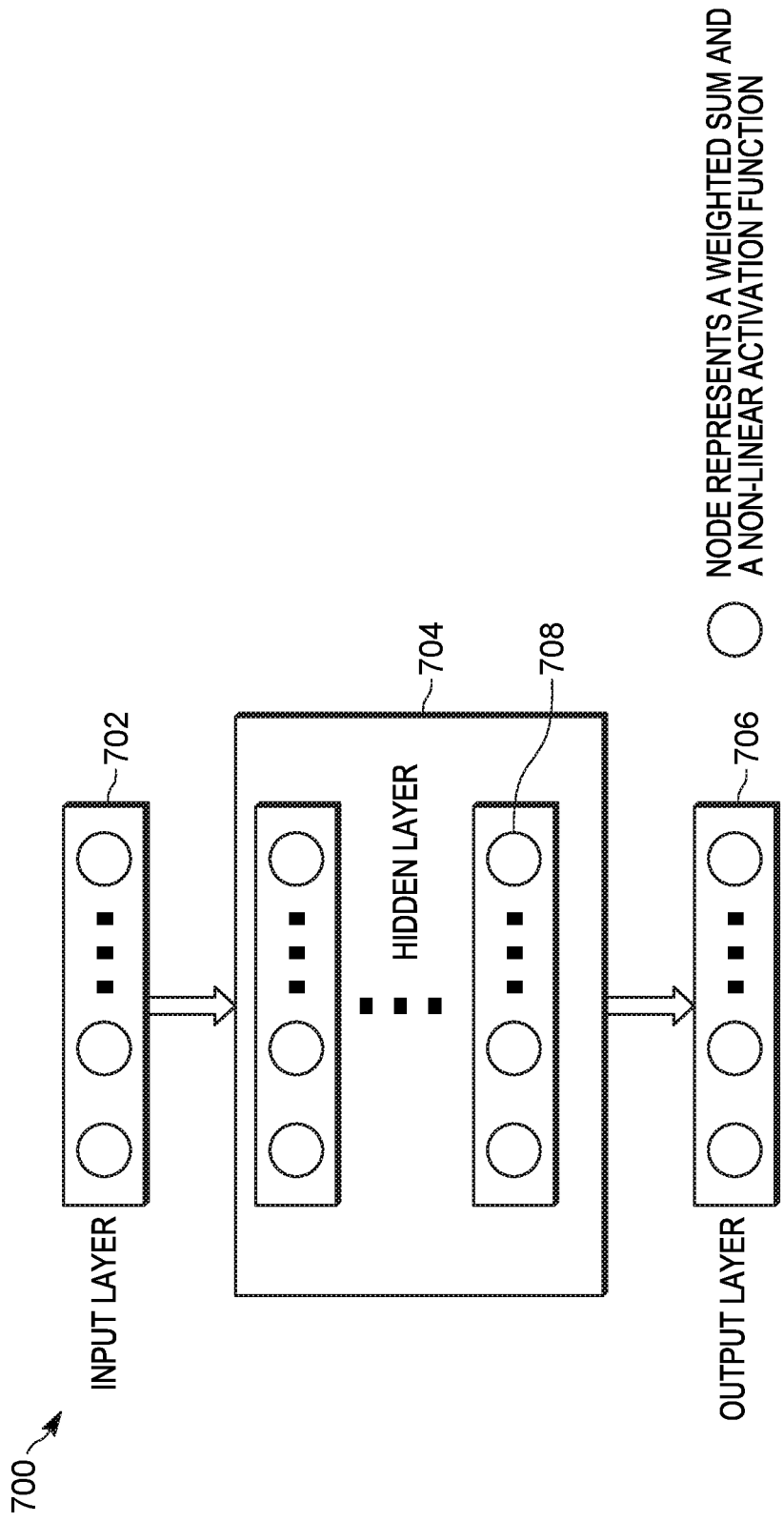
FIG. 7 is a diagram of a generic deep neural network (DNN) showing an input layer, a number of hidden layers and an output layer in accordance with various embodiments.

In accordance with various embodiments, Artificial Intelligence (AI) can be incorporated within the receiver of FIG. 2 and the method of FIG. 6 via one of a deep neural network (DNN) or reinforcement learning (RL). FIG. 7 is a diagram of a deep neural network (DNN) 700 that can be applied to the AI based interference detector 220 of FIG. 2 in accordance with some embodiments. The DNN 700 can be implemented in one or more microprocessing units, such as field programmable gate arrays (FPGA), graphics processing unit (GPU), and central processing unit (CPU) to name a few. The DNN 700 comprises an input layer 702, a plurality of hidden layers 704, and an output layer 706. Each of the plurality of DNN hidden layers 704 may comprise, for example, a convolutional neural net (CNN) layer, a recurrent neural net (RNN) layer, a long short term memory (LSTM) layer, and/or other suitable neural layers selected to facilitate RF classification. The plurality of hidden layers further comprise a plurality of nodes 708 providing a weighted sum and a non-linear activation function which, in accordance with the DNN embodiment, are used for image interference detection. The plurality of hidden layers 704 may be reconfigured by rearrangement of layer order and varying hyper-parameters such as learning rate to achieve best performance. The number of hidden layers, nodes per layer, and choice of activation function are just a few examples of the hyper-parameters that may be reconfigured to determine effectiveness of the DNN 700 for image detection. The output layer 706 of the plurality of hidden layers may be a 'dense' (fully connected) layer. In accordance with some embodiments, DNN 700 can be used for AI based classification interference detection. The DNN classifies the first mixer output into 'image interferer present' or 'image interferer absent' categories The DNN is trained for interference classifications prior to deployment of the portable radio receiver, and the trained DNN is then used for post deployment inference detection within the portable radio receiver.

Figure 8:
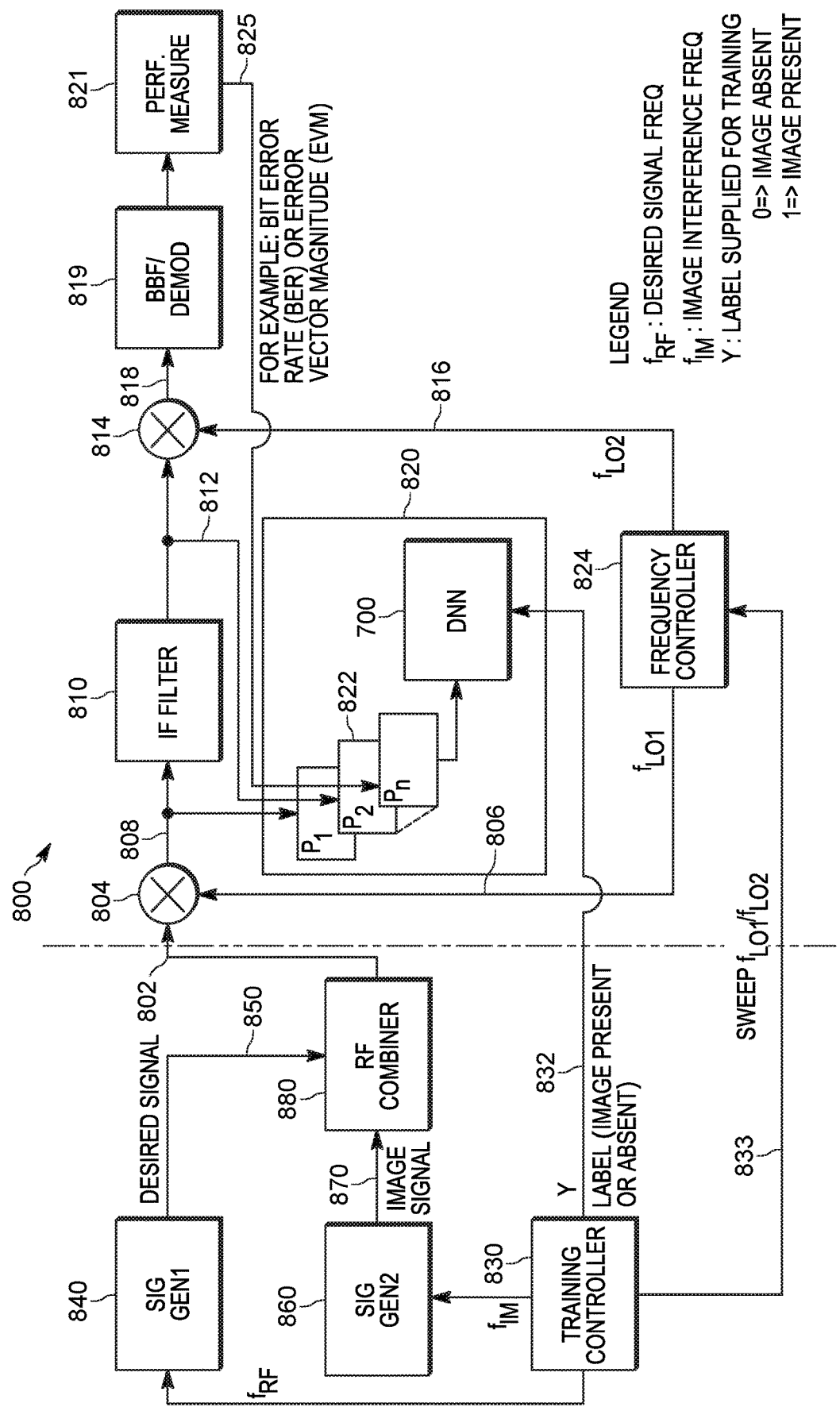
FIG. 8 is a block diagram of the receiver integrating DNN during the pre-deployment training phase in accordance with various embodiments.

FIG. 8 is a block diagram of a receiver 800 integrating DNN during a pre-deployment training phase in accordance with some embodiments. In this embodiment, the AI based interference detector 220 of FIG. 2 is represented by AI based interference detector 820 which incorporates DNN 700 of FIG. 7 for supervised training to detect image interference.

A simulated receiver input signal 802 having a potential image interferer is input to first mixer 804. The simulated receiver input signal 802 is generated using a training controller 830 which programs a first signal generator to generate a desired RF signal 850. The training controller 830 also programs a second signal generator 860 to generate a predetermined image signal 870. The desired RF signal 850 and predetermined image signal 870 are combined at RF combiner 880 to produce the simulated receiver input signal 802. The training process components such as training controller 830, RF generator 840, image interference generator 860, and RF combiner 880 are external to the radio receiver 800.

The receiver 800, like receiver 200, is a superhet receiver comprising a first mixer 804 that mixes, in this embodiment, the simulated RF signal 802 and a first LO signal 806 to generate an intermediate frequency (IF) signal 808. An IF filter 810 filters out the higher frequency components. The filtered IF signal 812 is applied to a second mixer 814, while a second local oscillator (LO) signal 816 is input to the second mixer to generate a baseband signal 818. The baseband signal 818 is applied to a baseband filter (BBF) and digital demodulator 819 and forwarded for performance measurement processing at performance measurement processing unit 821.

The AI based interference detector 820 further incorporates a plurality of processing units 822 ($P_1, P_2, \ldots, P_n$) operatively coupled to DNN 700. The DNN 700 as well as the processing units 822 ($P_1, \ldots, P_n$) can be implemented in FPGA, GPU or CPU or a combination thereof within the portable radio receiver. In accordance with this training embodiment, the plurality of processing units 822 receive pre-IF filter signals 808, post-IF filter signals 812 as well as post demodulation measurements 825, such as, for example, bit error rate (BER) or Error vector magnitude (EVM) to name a few. The processing units 822 may comprise, for example, receiver signal strength indicator (RSSI) processing unit, analog to digital converter processing (ADCs) unit, short term Fourier Transform (STFT) processing unit, to name a few. In accordance with this training embodiment, the pre-IF signals 808, post-IF signals 812 and post demodulation measurements 825 are processed through the plurality of processing units 822 ($P_1, P_2, \ldots, P_n$) the result of which are provided to DNN 700. During supervised training (performed by training controller 830), the weights and biases of the nodes of the deep neural network (DNN) 700 are continuously adjusted or "trained" using known labels (Y) (image present or image absent) 832 generated by the training controller 830 which are compared against the DNN's own estimate, $Y_{EST}$ (not shown). The training of the DNN is may be performed using established iterations of forward propagation to determine $y_{EST}$, comparing $y_{EST}$ against the known label Y and back-propagating the error between Y and $Y_{EST}$ to adjust the weights and biases at each node of the DNN.

In accordance with the DNN training embodiment, the training controller 830 sends commands 833 to the frequency controller 824 to sweep across a large plurality of predetermined LO frequencies. The commands 833 may comprise LO frequency selections for the first LO ($F_{LO1}$) and LO frequency selections for the second LO ($F_{LO2}$). For example, the training controller 830 may generate training data by triggering the frequency controller 824 to sweep over a predetermined number of values and combinations for the RF frequency 850 ($f_{RF}$) and LO frequencies ($f_{LO1}$ and $f_{LO2}$), where $f_{LO2}=f_{RF}-f_{LO1}$ while running a forward propagation and back propagation. During the training phase, the strengths (powers) of the RF frequency signal as well as the image signal are swept over a range of values. The training data is generated for both the cases of the image interferer present (with the interferer signal generator 860 turned ON) as well as the image interferer absent (interference signal generator 860 turned OFF).

During training, the receiver 800 processes the plurality of RF and LO1/LO2 sweeps with and without the presence of an image frequency, thereby training DNN 700 to detect the presence or absence of an image signal. For example, the DNN 700 may process millions of RF and LO1/LO2 sweeps with and without the presence of an image frequency to train DNN 700. During training, the DNN 700 has no output, but adjusts its own node weights and biases to better match an estimate of whether an image frequency is present or absent as controlled by the labels 832 provided by training controller 802 to DNN 700. The DNN 700 may also be further adjusted by fine tuning hyper-parameters such as the number of layer, types of layers, and learning rate, when the test data processed through processing units 822 (P1, . . . , Pn) does not meet a predetermined accuracy target threshold. The receiver 800 is ready for deployment when the test data does meet a predetermined accuracy target threshold for the DNN 700.

Figure 9:
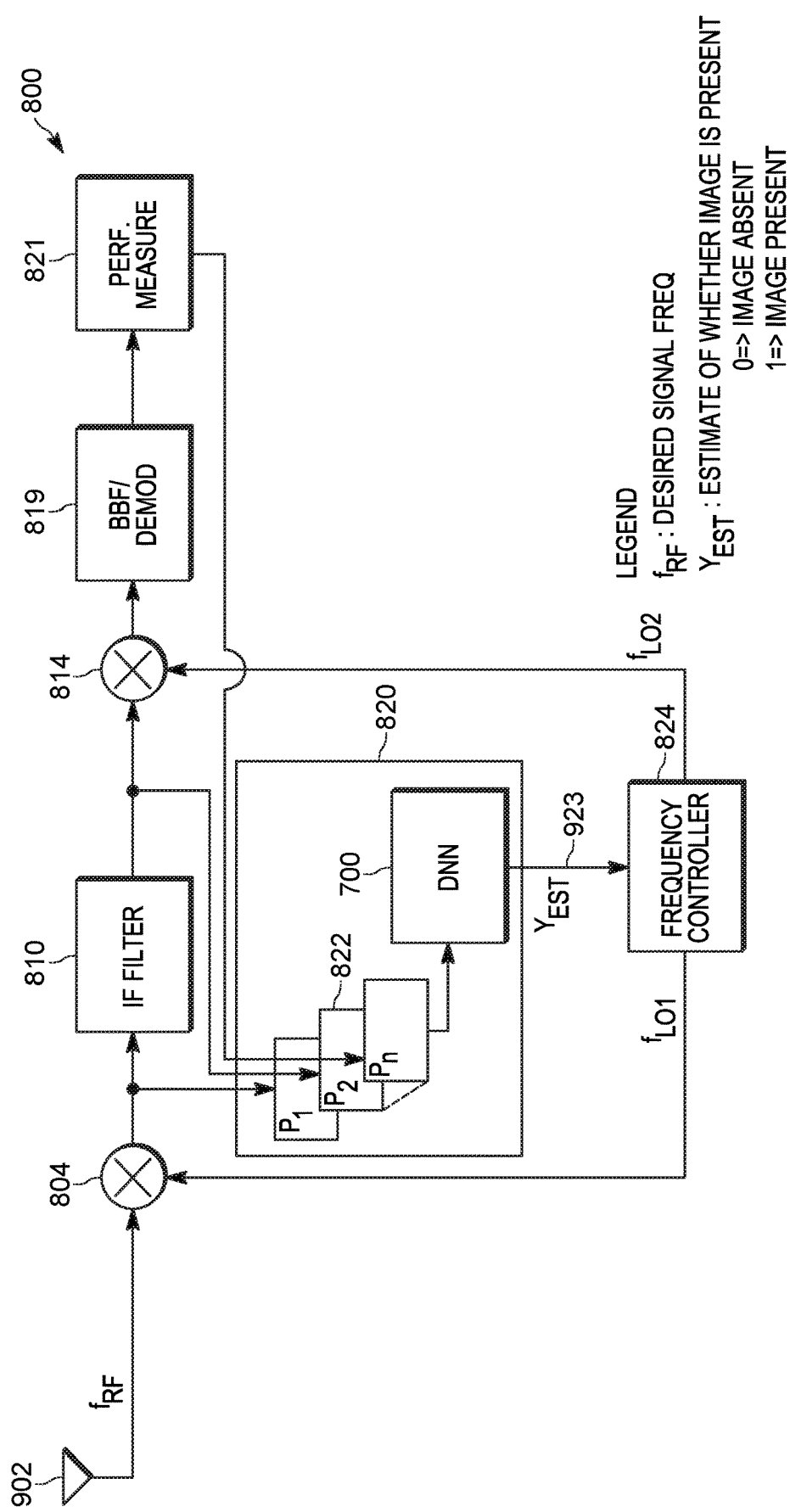
FIG. 9 is a block diagram of a receiver integrating DNN during the post-deployment inference phase in accordance with various embodiments.

FIG. 9 is a block diagram of the receiver 800 of FIG. 8 formed and operating using the trained DNN 700 in accordance with a post-deployment embodiment of the portable radio. The receiver 800 now receives the incoming RF signal ($f_{RF}$) via antenna 902. Once trained, the DNN 700 produces an estimate ($Y_{EST}$) 923 for the presence of an image interferer ($f_{IM}$) and provides this estimate to the frequency controller 824. The estimate ($Y_{EST}$) 923 provides the frequency controller with information to either move (if $Y_{EST}=1$) or dwell on the chosen $f_{LO1}$ and $f_{LO2}$ (if $Y_{EST}=0$). Mitigation of the interferer improves the receiver performance.

Hence, the DNN 700 provides pre-deployment supervised training of image interference detection using a plurality of training data, and the DNN further provides post deployment detection of image interference based on the pre-deployment supervised training.

Figure 10:
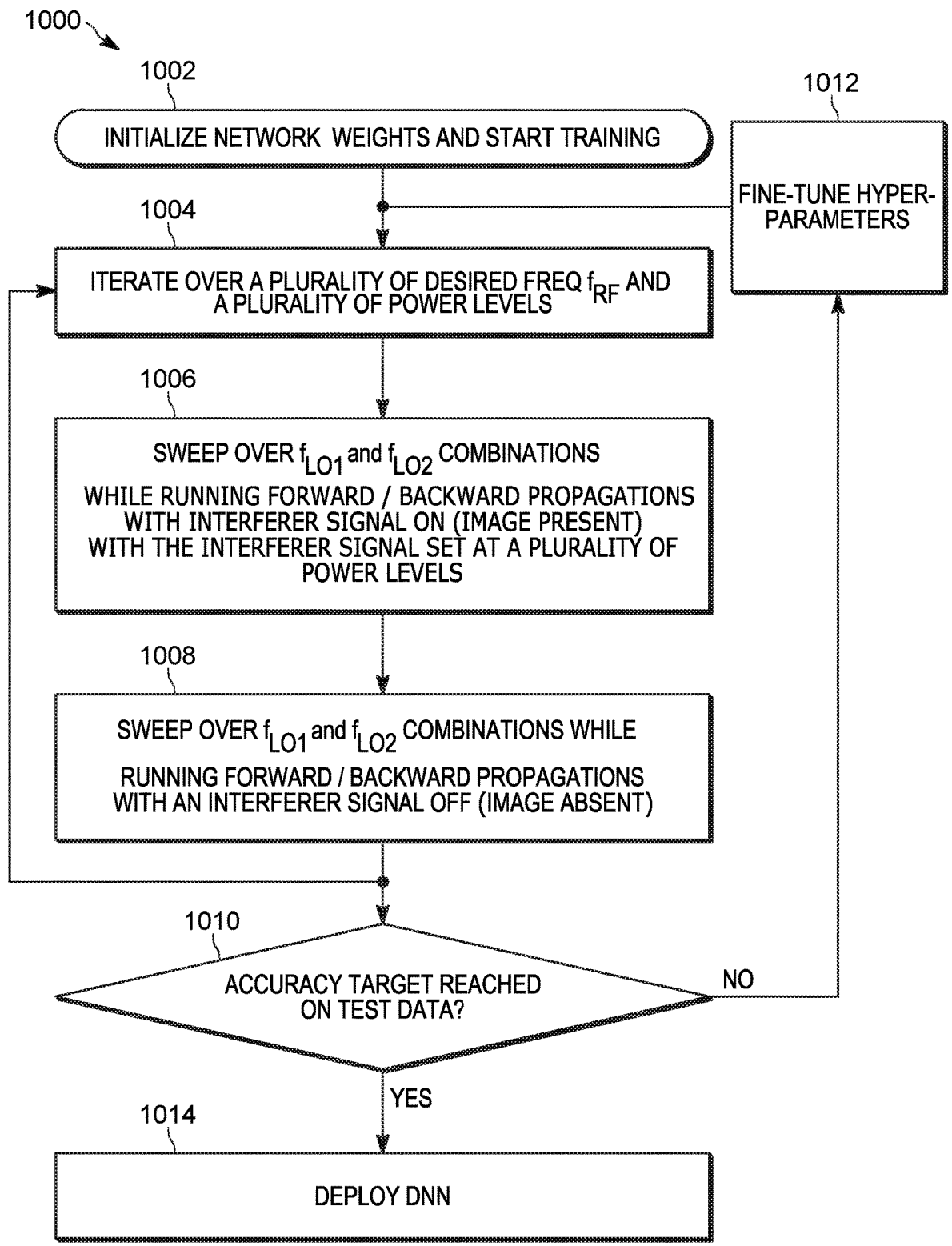
FIG. 10 is a flowchart outlining operation of the DNN approach to receiver image interference mitigation in accordance with various embodiments.

FIG. 10 is a flowchart outlining operation of the DNN approach to receiver image interference mitigation in accordance with the pre-deployment training embodiment. Method 1000 begins by initializing network weights (DNN 700 of FIG. 7) to begin DNN training at 1002. Iterations over a plurality of desired RF frequencies with plurality of amplitudes (power levels) occur at 1004 in conjunction with sweeping of the first and second LO frequencies in various combinations at 1006. During the LO sweeping, an interferer is randomly applied, with plurality of amplitudes (power levels) and injected into the receiver at 1006. Forward and backward propagations are used for the update of the weights and biases inside the nodes of the DNN. Similar sweeping takes place at 1008 in the absence of image interferer. A predetermined accuracy target of the DNN takes place at 1010. If the accuracy target has not been reached at 1010, then fine tuning of DNN hyper-parameters takes place at 1012. For example, the number of layers, type of layers, and learning rate of the DNN can be adjusted, and the method returns back to iterating at 1004. When the accuracy target has been reached at 1010, then the DNN of the receiver is considered ready for deployment at 1014.

Figure 11:
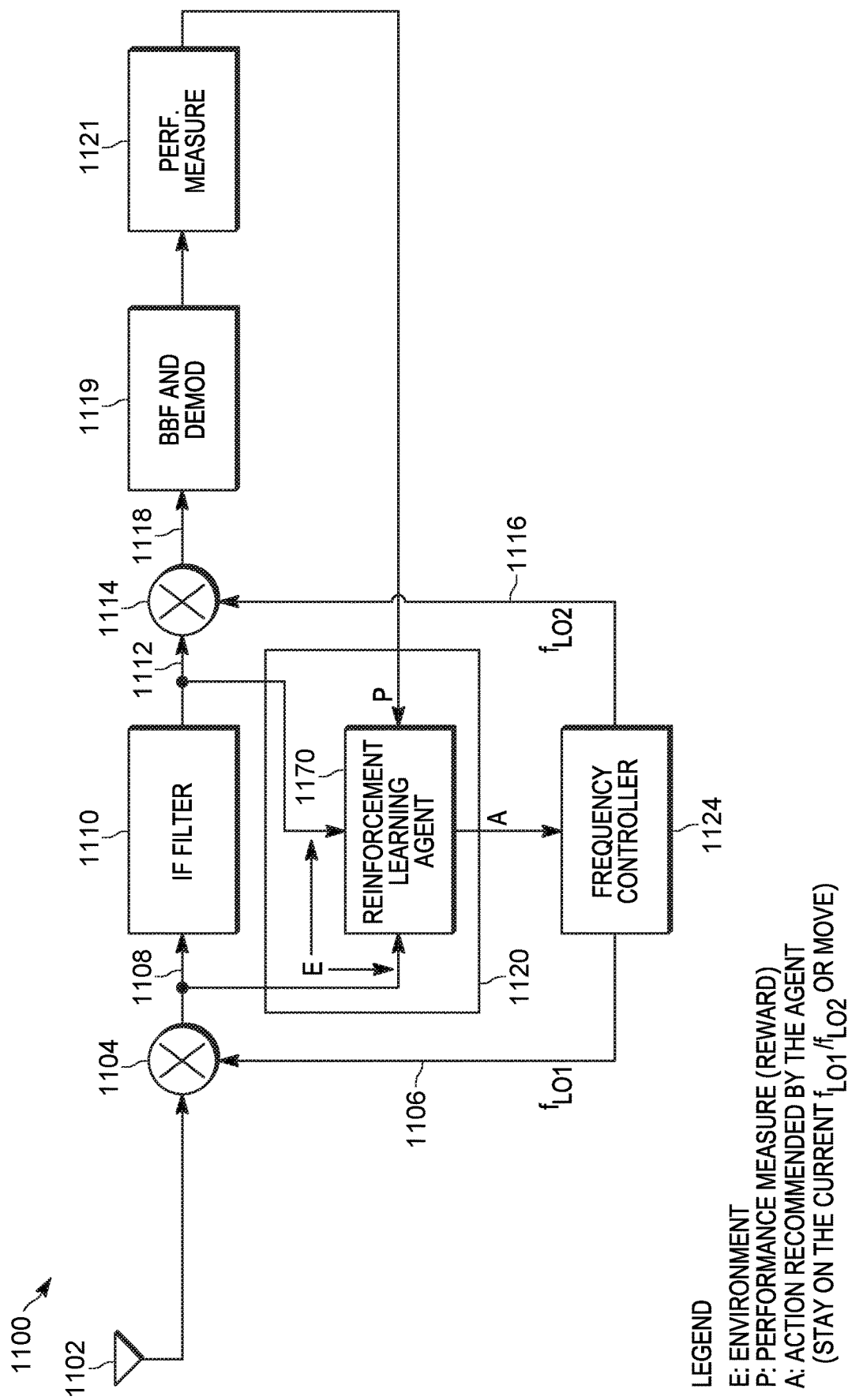
FIG. 11 is a block diagram of a receiver integrating a realization of image mitigation controlled by a reinforcement learning (RL) based machine learning (ML) module in accordance with various embodiments.

FIG. 11 is a block diagram of a receiver 1100 for a portable radio integrating an AI based interference detector 1170 in the form of a reinforcement learning (RL) agent 1120 in accordance with some embodiments. Receiver 1100 is a superheterodyne receiver comprising, as described in other embodiments, a first mixer 1104, an IF filter 1110, a second mixer 1114, a baseband filter and demodulator 1119 and a performance measurement block 1121 and frequency controller 1124. In accordance with this embodiment, the frequency controller 1124 is steered using the RL agent 1120.

Receiver 1100 integrates reinforcement learning (RL) via the RL agent 1120, the RL agent 1120 advantageously providing unsupervised learning of image interference detection without training data. The term unsupervised as used in the context of machine learning means that there is no need for a pre-deployment training phase in which the machine is fed examples of signals with and without image interference. The RL agent 1120 detects the presence and non-presence of image interference in a received signal 1102 and determines whether to take action to change frequency of the first LO signal 1106 and the second LO signal 1116 based on a plurality of environmental inputs (E) and a performance measure input (P). The environmental input signals are derived from the IF signal 1108 prior to IF filtering at IF filter 1110 and the IF filter output signal 1112. For example, the RL agent 1120 may determine a received signal strength indicator (RSSI) and/or perform a Fourier Transform (FFT) on the pre-filtered IF signal 1108 and the post filtered IF signal 1112 and utilize these as environmental inputs. The RL agent 1120 also receives performance measurements (P) such as bit error rate (BER) and/or error vector magnitude (EVM) associated with the baseband signal. The RL agent 1120 uses the performance measurement (P) as well as the environmental inputs (E) to determine an output action (A) with which to steer the frequency controller 1124. The RL agent 1120 uses policies such as monte carlo methods or temporal difference learning methods to determine frequency change actions to the first LO signal 1106 and the second LO signal 1116. The RL agent's policy defines the learning agent's manner of behaving at a given time. The policy provides a mapping of actions (stay on the current $f_{LO1}$, $f_{LO2}$ or more) based on the environmental inputs and the performance measurement.

Figure 12:
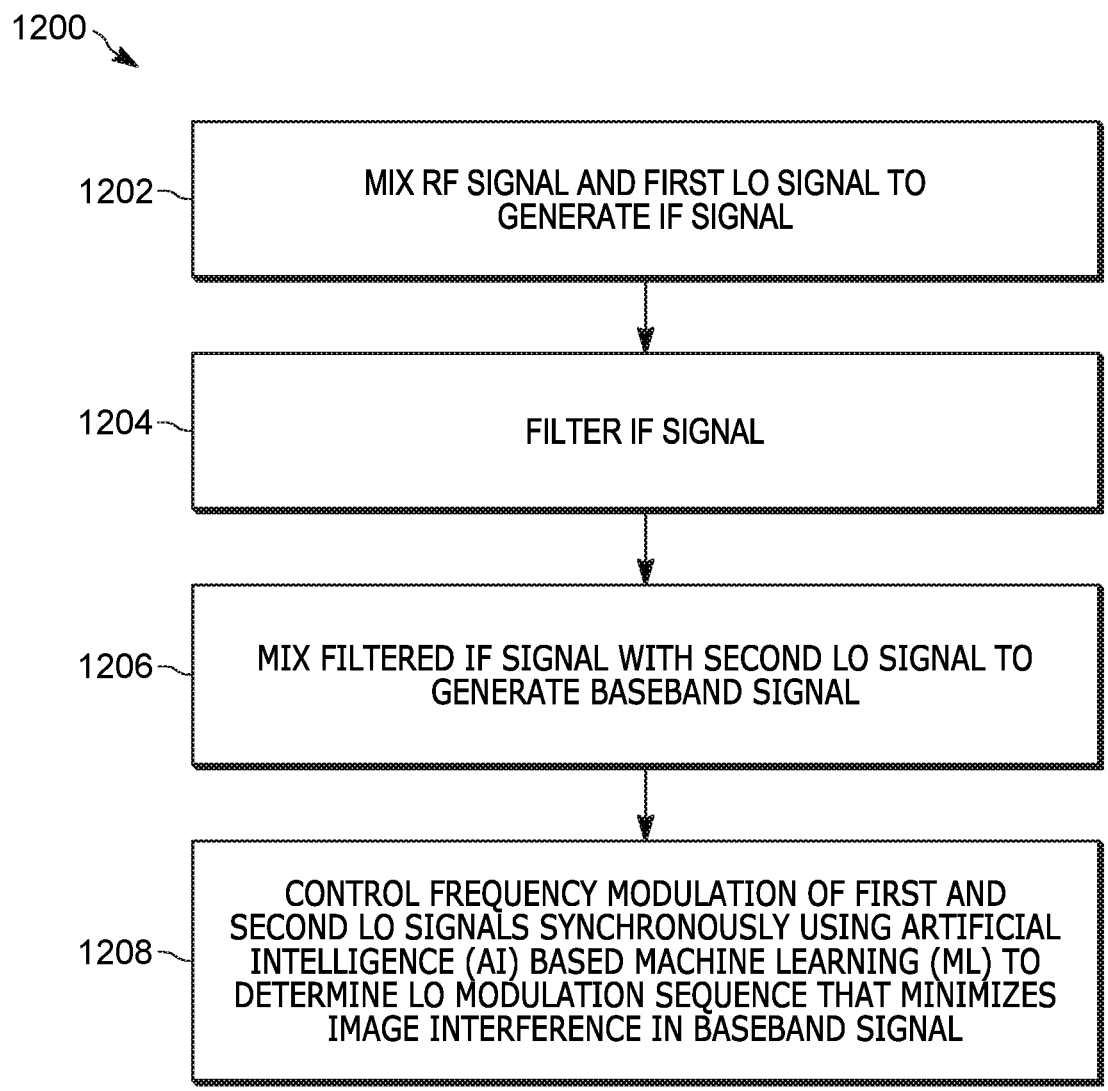
FIG. 12 is a flowchart summarizing a method for mitigating image interference in a receiver in accordance with various embodiments.

FIG. 12 is a flowchart summarizing a method 1200 for mitigating image interference in a receiver in accordance with various embodiments. The method begins at 1202 with mixing a radio frequency (RF) signal and a first local oscillator (LO) signal to generate an intermediate frequency (IF) signal, followed by filtering the IF signal to generate a filtered IF signal at 1204, and then mixing the filtered IF signal and a second local oscillator (LO) signal to generate a baseband signal at 1206. In accordance with the various embodiments, mitigation is accomplished at 1208 by controlling frequency modulation of the first and second LO signals synchronously using a frequency controller, the frequency controller using Artificial Intelligence (AI) based machine learning (ML) to generate a plurality of LO frequency modulation selections and apply an LO modulation sequence that minimizes image interference in the baseband signal. As described by the previous embodiments, the AI based machine learning may be enabled with DNN or RL.

When the AI based machine learning is enabled through DNN the method further comprises iteratively fine tuning hyper-parameters to sufficiently train the DNN prior to receiver deployment based on known image interference; and detecting image interference, post receiver deployment, using the DNN to steer the LO modulation so as to minimize the image interference. Fine tuning hyper-parameters of the DNN can be accomplished via one or more of: adjusting number of layers rate of the DNN, adjusting type of layers rate of the DNN, and adjusting learning rate of the DNN. For DNN applications, an estimate of image interference post receiver deployment is provided to the frequency controller along with information to either move (if $Y_{EST}=1$) or dwell on the currently selected $f_{LO1}$ and $f_{LO2}$ (if $Y_{EST}=0$).

When the AI based machine learning is enabled through RL, the RL learning, as previously described, performs detection of presence or absence of image interference in the received signal based on various environmental inputs associated with the first and second LO frequencies and a performance measurement associated with baseband as a reward in order to decide whether to change the first and second LO frequencies in a synchronized fashion while applying pulse shaping.

Accordingly, an improved superheterodyne receiver for a portable radio has been provided. The receiver includes a frequency controller that applies pulse-shaped modulation to first and second LO signals in a synchronized manner. The frequency controller is controlled using Artificial Intelligence (AI) based machine learning (ML) to generate a plurality of LO modulation selections and apply an LO modulation sequence from the plurality of LO modulation selections that minimizes image interference to the receiver's baseband signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A receiver, comprising:
   a first mixer receiving a radio frequency (RF) signal and a first local oscillator (LO) signal to generate an intermediate frequency (IF) signal;
   an IF filter filtering the IF signal to generate a filtered IF signal;
   a second mixer receiving the filtered IF signal and a second local oscillator (LO) signal to generate a baseband signal;
   a frequency controller coupled between the first and second mixers, the frequency controller applying pulse-shaped modulation to the first and second LO signals in a synchronized manner; and
   the frequency controller being steered by Artificial Intelligence (AI) based machine learning (ML) to determine first and second LO modulations that cancel each other to generate the baseband signal, and the first and second LO modulations add to each other to spread image interference.

2. The receiver of claim 1, wherein the frequency controller operates using the Artificial Intelligence (AI) based machine learning (ML) to determine a pulse shaped modulation for applying to the first LO signal and an equal and opposite pulse shaped modulation to apply to the second LO signal for image interference mitigation.

3. The receiver of claim 2, wherein the pulsed shaped modulation applied to the first LO limits spectral regrowth of the IF signal, and the equal and opposite pulsed shaped modulation applied to the second LO enables reconstruction of the baseband signal.

4. The receiver of claim 1, wherein the Artificial Intelligence (AI) comprises at least one of:
   a deep neural network (DNN); and
   a reinforcement learning (RL) agent.

5. The receiver of claim 4, wherein the DNN provides pre-deployment supervised training of image interference detection using a plurality of training data, and the DNN provides a post deployment detection of image interference based on the pre-deployment supervised training.

6. The receiver of claim 4, wherein the RL agent provides unsupervised learning of image interference detection based on performance measurements associated with the baseband signal being input to the RL agent and environmental inputs associated with the IF signal and filtered IF signal being input to the RL agent.

7. The receiver of claim 6, wherein the RL agent detects for presence and non-presence of image interference in the received RF signal and determines whether to take an action to change frequency of the first LO signal and the second LO signal based on the performance measurements and environmental inputs.

8. The receiver of claim 7, wherein the environmental inputs to the RL agent comprise at least one of:
   receive signal strength indicator (RSSI) of the IF signal and filtered IF signal;
   Fourier Transform of the IF signal and filtered IF signal.

9. The receiver of claim 7, wherein the performance measurements associated with the baseband signal being input to the RL agent, comprise at least one of:
   bit error rate (BER); and
   error vector magnitude (EVM).

10. A method of controlling interference to a receiver, comprising: mixing a radio frequency (RF) signal and a first local oscillator (LO) signal to generate an intermediate frequency (IF) signal; filtering the IF signal to generate a filtered IF signal; mixing the filtered IF signal and a second local oscillator (LO) signal to generate a baseband signal; and controlling frequency modulation of the first and second LO signals synchronously using pulse shaping via a frequency controller, the frequency controller being steered by Artificial Intelligence (AI) based machine learning (ML) to determine first and second LO modulations that cancel each other to generate the baseband signal, and the first and second LO modulations add to each other to spread image interference.

11. The method of claim 10, wherein the AI based machine learning is enabled with one of:
a deep neural network (DNN);
a reinforcement learning (RL) agent.

12. The method of claim 11, wherein the AI based machine learning enabled through DNN further comprises the steps of:
iteratively fine tuning hyper-parameters to sufficiently train the DNN prior to receiver deployment based on known image interference; and
detecting image interference, post receiver deployment, using the DNN to steer the LO modulation to minimize the image interference.

13. The method of claim 12, wherein fine tuning hyper-parameters of the DNN comprises one or more of: adjusting number of layers of the DNN, adjusting type of layers of the DNN, and adjusting learning rate of the DNN.

14. The method of claim 12, wherein an estimate of image interference post receiver deployment is provided to the frequency controller along with information to either move or dwell on a currently selected first LO and second LO.

15. The receiver of claim 11, wherein the RL agent detects for presence and non-presence of image interference in the received RF signal and determines whether to take an action to change frequency of the first LO signal and the second LO signal based on the performance measurements and environmental inputs.

16. The method of claim 11, wherein the RL agent provides unsupervised learning of image interference detection based on performance measurements associated with the baseband signal being input to the RL agent and environmental inputs associated with the IF signal and filtered IF signal being input to the RL agent.

17. The method of claim 16, wherein the environmental inputs to the RL agent comprise at least one of:
receive signal strength indicator (RSSI) of the IF signal and filtered IF signal;
Fourier Transform of the IF signal and filtered IF signal.

18. The method of claim 16, wherein the performance measurements associated with the baseband signal being input to the RL agent, comprise at least one of:
bit error rate (BER); and
error vector magnitude (EVM).

* * * * *